Oct. 20, 1970     J. B. MONROE     3,534,878

BALE WAGON WITH STACK RETRIEVING APPARATUS

Filed Sept. 17, 1969     2 Sheets-Sheet 1

INVENTOR
JOE B. MONROE

BY
*Dunlap, Laney, Hessin & Dougherty*
ATTORNEYS

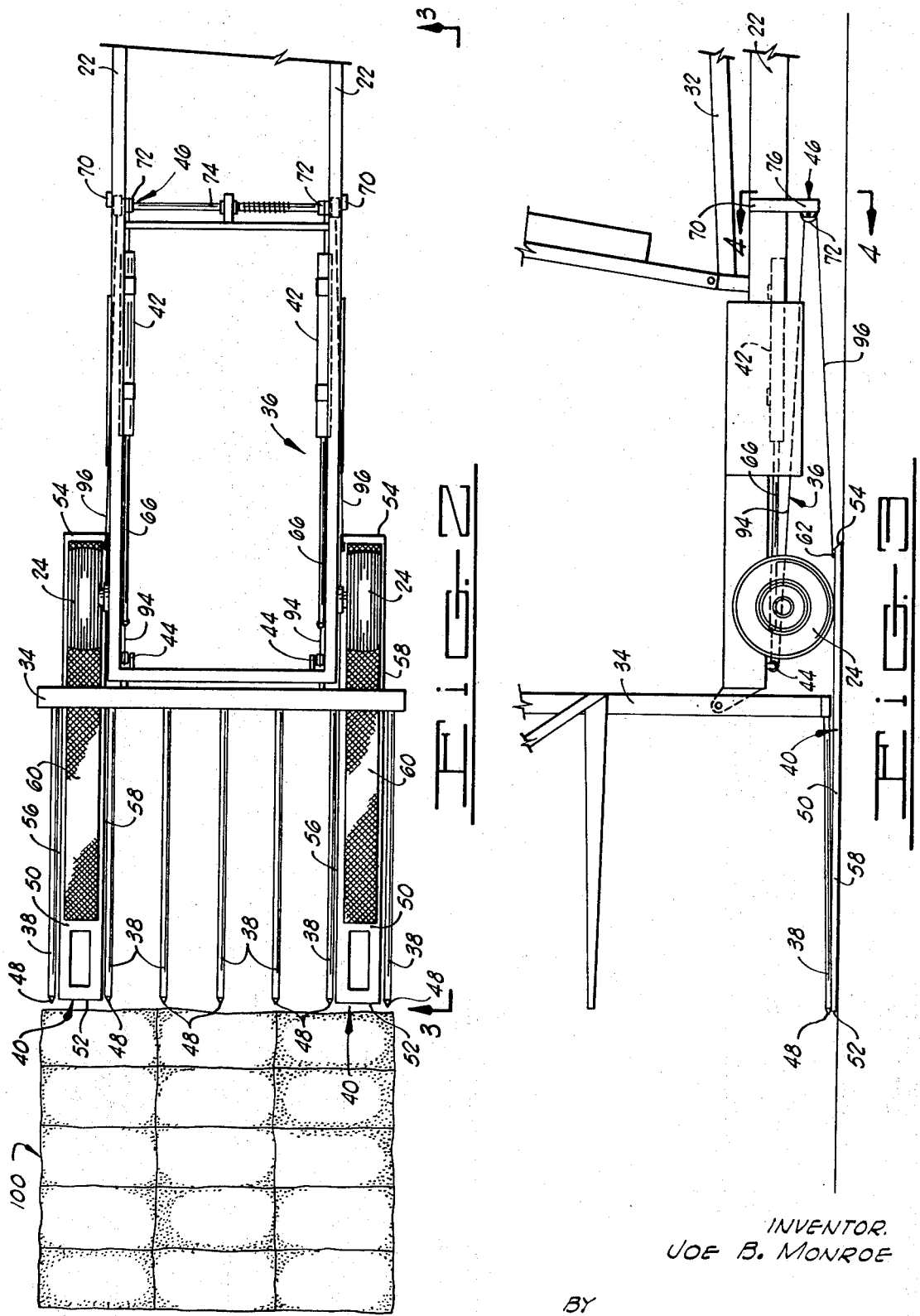

United States Patent Office 3,534,878
Patented Oct. 20, 1970

3,534,878
BALE WAGON WITH STACK RETRIEVING APPARATUS
Joe B. Monroe, P.O. Box 278, Cherokee, Okla. 73728
Continuation-in-part of application Ser. No. 826,450, May 21, 1969. This application Sept. 17, 1969, Ser. No. 858,826
Int. Cl. B60p 1/04
U.S. Cl. 214—354                     6 Claims

ABSTRACT OF THE DISCLOSURE

A bale wagon for transporting, loading and unloading a stack of bales having a stack retrieving assembly which is adapted to pull the bale wagon completely under the stack of bales without the necessity of resetting the particular power source.

CROSS-REFERENCE TO RELATED APPLICATION

This application is a continuation-in-part of applicant's copending application entitled, "Bale Wagon," Ser. No. 826,450, filed May 21, 1969.

BACKGROUND OF INVENTION

Field of invention

This invention relates generally to improvements in bale wagons, and more particularly, but not by way of limitations, to a bale wagon having an improved stack retrieving apparatus thereon.

Description of the prior art

In the applicant's above-mentioned copending application, there was shown and described a bale wagon having a stack retrieving apparatus. The stack retrieving apparatus utilized a hydraulic cylinder for the power source. The piston rod of the hydraulic cylinder was directly connected to a fixed location on a track via a cable in such a manner that as the piston rod was retracted into the hydraulic cylinder the bale wagon was moved along the track toward the stack of bales. The distance which the bale wagon moved along the track was limited by the length of the stroke of the particular hydraulic cylinder.

There are applications where it is desirable to use an existing power source or hydraulic cylinder, such as the hydraulic cylinder on some bale wagons which is used to control the push off feet of the bale wagon. It is apparent that one stroke of this existing hydraulic cylinder may not be sufficiently long to pull the bale wagon completely under the stack of bales. It was therefore necessary in these situations to refix and adjust the cable to the fixed location on the track, and reactuate the hydraulic cylinder. This particular procedure was repeated a sufficient number of times to pull the bale wagon completely under the stack of bales.

SUMMARY OF THE INVENTION

The present invention contemplates a bale wagon which is employed for stacking and unloading bales of hay and the like, and which includes a rack onto which layers of the bales are positioned to form a stack of bales. The improvement contemplated by the present invention includes a plurality of tines secured in spaced relation on one end of the rack and positioned to be moved under a stack of bales being loaded on the bale wagon. A guide means is provided to support the bale wagon and guide the bale wagon toward the stack of bales which are to be loaded on the bale wagon. A retrieving means is supported on the bale wagon and basically comprises a hydraulic cylinder means having a shaft which reciprocates therein as the hydraulic cylinder means is actuated. A cable means is secured between the guide means and the hydraulic cylinder means for pulling the bale wagon a certain distance toward the stack of bales and forcing the tines under the stack of bales upon actuation of the retrieving means. A cable power transfer means is connected to the cable means generally between the hydraulic cylinder means and the guide means. The cable power transfer means is adapted to proportion the cable means so that the bale wagon is pulled the required distance toward the stack of bales notwithstanding the stroke of the hydraulic cylinder means.

An object of the invention is to provide a bale wagon capable of loading a stack of bales thereon, notwithstanding the fact that the particular terrain may be irregular, or the surface traction provided for the bale wagon is not secure.

Another object of the invention is to provide a bale wagon having an improved stack retrieving apparatus which is capable of moving the bale wagon toward the stack of bales a certain distance notwithstanding the design of the particular power source.

A further object of the invention is to provide a bale wagon having an improved stack retrieving apparatus which is adapted to utilize an existing power source on the bale wagon.

A still further object of the invention is to provide a bale wagon capable of more efficiently and economically loading and unloading a stack of bales therefrom.

Other objects and advantages of the invention will be evident from the following detailed description, when read in conjunction with the accompanying drawings, which illustrate the various embodiments of the invention.

BRIEF DESCRIPTION OF THE DRAWING

FIG. 2 is a top elevational view illustrating the stack retrieving assembly in one position thereof with respect to a stack of bales.

FIG. 3 is a side elevational view of the stack retrieving assembly of FIG. 2 taken substantially along the lines 3—3 of FIG. 2.

DESCRIPTION OF THE PREFERRED EMBODIMENT

Figure 1:
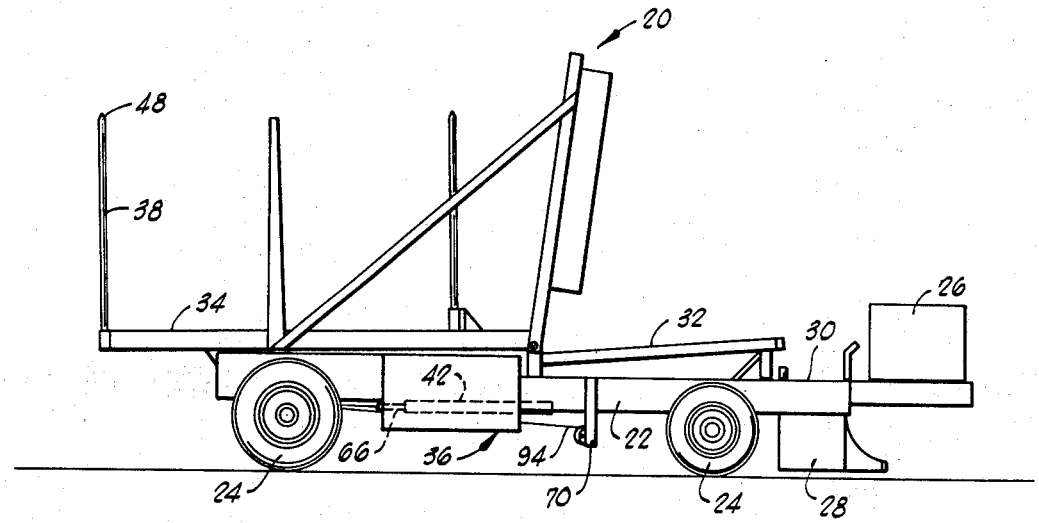
FIG. 1 is a side elevational view of a bale wagon.

Referring to the drawings in detail, and to FIG. 1 in particular, shown therein and designated by the general reference character 20 is a bale wagon basically comprising a frame 22 supported by a plurality of wheels 24; an operator cab 26 secured to the frame 22; a bale chute assembly 28, which is also secured to the frame 22; and a conveyor type platform 30, a table 32, and a rack 34 all of which are supported by the frame 22. A bale wagon having the basic components as described above is commercially available from such farm machinery manufacturers as, for example, New Holland Division of Sperry Rand Corp., New Holland, Pa., and therefore no further detailed description is required herein.

The bale wagon 20 is also provided with the improvement contemplated by the present invention, in particular the stack retrieving assembly designated by the general reference character 36, which will be described in detail below.

As shown in FIGS. 2 and 3, the rack 34 has been moved to a loading and unloading position wherein it is oriented generally perpendicular to the frame 22, adjacent one end thereof, for purposes of clarity of description. The stack retrieving assembly 36 basically comprises a plurality of tines 38, a pair of track assemblies 40, a pair of hydraulic cylinders 42, a pair of guide pulleys 44, and a cable power transfer assembly 46.

The tines 38 extend generally perpendicular to the rack 34 at one end thereof. One end of each tine 38 is secured to the rack 34, and the opposite end 48 thereof is generally conically shaped, for reasons to be made more apparent below.

As shown in FIG. 2, each track assembly 40 basically comprises: a support member 50, having opposite ends 52 and 54, and opposite sides 56 and 58 thereon. A wire mesh grid 60 is secured to one surface of the support member 50 opposite the surface thereof adjacent the terrain, and extends generally between the ends 52 and 54. A hook 62 is secured to the end 54 of each support member 50 for reasons to be made apparent below.

In one form, a plurality of post members (not shown) are secured to the surface of each support member 50 opposite the surface on which the wire mesh grid 60 is secured. The post members extend generally between the sides 56 and 58 of each support member 50 and are provided to extend generally perpendicular thereto. During the operation of the stack retrieving assembly 36 the post members will extend into the surface of the ground, and thereby secure the track assemblies 40 in an operative position.

Each track assembly 40 is sized and disposed with respect to the bale wagon 20 to accommodate the wheels 24 positioned thereon during the stack retrieving operation, which will be described in more detail below.

Each hydraulic cylinder 42 is secured to the frame 22 of the bale wagon 20, and the hydraulic cylinders 42 are oriented with respect to each other to be on opposite sides of the frame 22. Each hydraulic cylinder 42 is provided with a shaft 66 which will extend a distance therefrom when the hydraulic cylinder 42 is actuated. As shown in FIGS. 2 and 3, each shaft 66 has been extended the full distance from its respective hydraulic cylinder 42.

The stack retrieving assembly 36 is particularly adapted to be used in cooperation with existing hydraulic cylinders on the bale wagon 20. For example, most bale wagons have various hydraulic cylinders mounted either on the frame of the bale wagon or in close proximity thereto. More particularly, on a bale wagon of type manufactured by New Holland Division of Sperry Rand Corp., mentioned before, there are two hydraulic cylinders which actuate what are referred to as "push-off feet." The push-off feet are adapted to extend a distance perpendicular to the rack 34, when the rack 34 is in the unloading position, that is, in a position generally perpendicular to the frame of the bale wagon. After a stack of bales has been unloaded the hydraulic cylinders are actuated and the push-off feet are extended from the rack into engagement with the stack of bales. In this manner the push-off feet will engage the stack of bales and move the bale wagon away from the stack of bales. Since the existing hydraulic cylinders function to actuate the push-off feet, they are sized, particularly with respect to the stroke thereof, to accomplish this function. The stack retrieving assembly 36 is particularly adapted to utilize this existing power source in a manner as will be described in more detail below.

Each pulley wheel 44 is rotatingly secured to the frame 22 of the bale wagon 20, and is generally oriented to extend perpendicular to the frame 22 and in general alignment with the shaft 66 of the respective hydraulic cylinder 42.

The cable power transfer assembly 46 is disposed on the frame 22 of the bale wagon 20, generally between the respective hydraulic cylinder 42 and the front of the bale wagon 20 opposite the end of the bale wagon 20 on which the tines 48 are located. The cable power transfer assembly 46 basically comprises a pair of support arms 70, a pair of cable drums 72, and a shaft 74.

Each support arm 70 is secured on one end portion thereof to the frame 22 of the bale wagon 20, and is sized and disposed to extend a distance in a generally downward direction from the frame 22 of the bale wagon 20 terminating with a lower end portion 76. In an assembled position as shown in FIGS. 3 and 4 the support arms 70 are disposed on opposite sides of the bale wagon 20 and are in alignment, for reasons which will be made apparent below.

The shaft 74, having opposite end portions 78 and 80, extends between the two support arms 70. The end portion 78 of the shaft 74 is rotatingly secured in one of the support arms 70, and the opposite end portion 80 of the shaft 74 is rotatingly secured in the other support arm 70.

One of the cable drums 72 is keyed on the shaft 74 generally near the end portion 78 thereof, and the other cable drum 72 is keyed on the shaft 74 generally near the end portion 80 thereof. In a preferred form, the cable drums 72 are of identical construction and each cable drum 72 is located with respect to one of the hydraulic cylinders 42 and one of the pulley wheels 44 to receive a cable therefrom as will be described in detail below.

Figure 4:
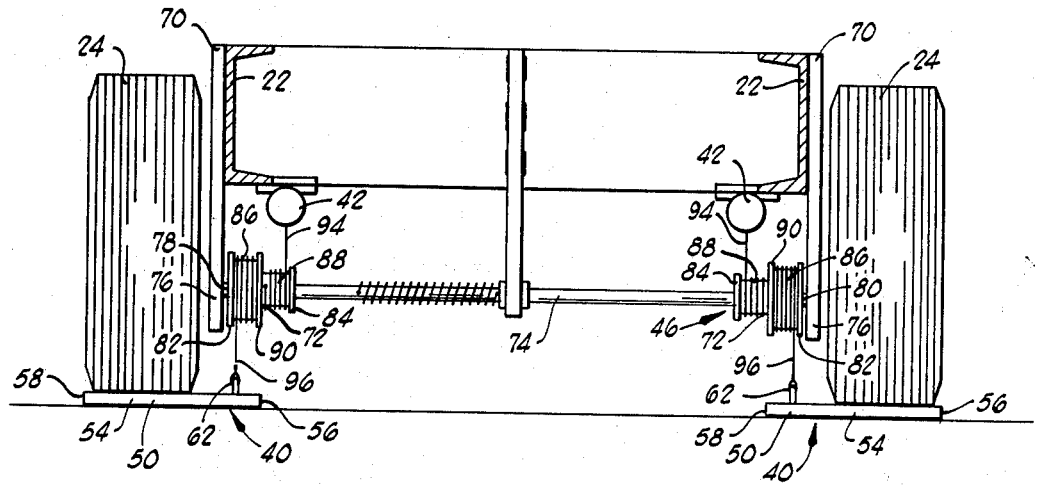
FIG. 4 is a sectional view taken substantially along the lines 4—4 of FIG. 3.

As shown more clearly in FIG. 4, each cable drum 72 is generally cylindrically shaped, and has opposite retaining plates 82 and 84 secured on the opposite ends thereof. A portion 86 of each cable drum 72 has a larger diameter than does the remaining smaller diameter portion 88 of each cable drum 72. The larger diameter portion 86 is separated from the smaller diameter portion 88 of each cable drum 72 by a retaining plate 90. The purpose and relative sizing of the larger and smaller diameter portions 86 and 88 respectively will be described in more detail below.

The cable power transfer asembly 46 also includes a pair of rod cables 94 and a pair of track cables 96. In one form, one end of each track cable 96 is secured to the hook 62 of the respective track assembly 40. In an alternate form, one end of each track cable 96 is secured to a fixed point such as a stake or another cable, which is positively positioned with respect to the stack of bales. The opposite end of each track cable 96 is secured to the larger diameter portion 86 of the respective cable drum 72. One end of each rod cable 94 is secured to the smaller diameter portion 88 of the respective cable drum 72. Each rod cable 94 is extended over the respective guide pulley 44, and the opposite end of each rod cable 94 is secured to the end of rod 66 of the respective hydraulic cylinder 42.

It is apparent from the foregoing that each rod cable 94 is so oriented with respect to its guide pulley 44 and with respect to its asosciated cable drum 72, that when each hydraulic cylinder 42 is actuated and the shaft 66 thereof is reciprocated or retracted into its respective cylinder, each rod cable 94 will cause the associated cable drum 72 to rotate. It is also apparent that as each cable drum 72 rotates, the respective track cable 96 will be retrieved by its associated cable drum 72, thereby pulling the bales into a stack on the bale wagon 20, for transportward the end 52 thereof.

OPERATION OF THE PREFERRED EMBODIMENT

A bale wagon of the type generally described hereinbefore is used to pick up bales from a field and to position the bales into a stack on the bale wagon 20, for tranporting and subsequently unloading the stock therefrom. The bale wagon is normally operated by an operator who is positioned in the operator cab assembly 26, as shown in FIG. 1.

The operator will guide the bale wagon 20 across the field, such that the bales, which are located in various positions on the field, are guided into the bale chute assembly 28. The bale chute assembly 28 will lift the bales from the field and guide the bales onto the conveyor type platform 30.

The conveyor type platform 30 incorporates means to position the bales thereon, so that there will be an adequate amount of space available to accept subsequent bales positioned thereon from the bale chute assembly 28. The bales are positioned on the conveyor type platform 30 until a row of bales has been positioned thereon. The number of bales which constitute a row will of course depend on the size of the particular bale wagon; however, generally speaking two or three bales will constitute a row.

When the number of bales constituting a row have been positioned on the conveyor type platform 30, a pusher (not shown) on the platform 30 is activated, and will move the entire row of bales back onto the table 32. This process of moving rows of bales onto the table 32 will be repeated until the table 32 has received a predetermined number of rows of bales, the exact number of which will depend on the particular size of bale wagon.

When the predetermined number of rows of bales, constituting a layer of bales, have been positioned on the table 32, the forward end of the table 32 will be raised, thereby moving the layer of bales onto the rack 34. This process of moving layers of bales from the table 32 to the rack 34 will be repeated until a predetermined number of layers of bales constituting a stack of bales, have been positioned on the rack 34. The stack of bales on the rack 34 may thus be transported to an area where the stack of bales is to be located for storage or other such purposes.

To unload the stack of bales from the rack 34, the rack 34 is tilted from a horizontal position to a position generally perpendicular to the bale wagon 20 as shown in FIGS. 2 and 3. The bale wagon 20 is then pulled away from the stack of bales. After the stack of bales has been unloaded, the rack 34 is then activated and moved to its original position on the bale wagon 20, thus the bale wagon 20 is once again in position to pick up more bales from a field.

A bale wagon generally capable of performing the above mentioned functions is commercially available as previously mentioned, and therefore no further detailed description is required herein. The following detailed description of the operation of the bale wagon 20 is limited to the stack retrieving assembly 36 which constitutes the improvement contemplated by the present invention.

When it is desired to use the bale wagon 20 to pick up a stack of bales from a storage area, each track assembly 40 of the stack retrieving assembly 36 is positioned with respect to a stack of bales as shown in FIG. 2. The stack of bales as shown in FIG. 2 is designated by the general reference character 100. The end 52 of each track assembly 40 is positioned adjacent the stack of bales which is to be retrieved, and the track assemblies 40 are positioned a distance apart to accommodate the wheels 24 of the bale wagon 20.

East of the track assemblies 40 may be secured in the proper operating position by a positioning pin (not shown), and each track assembly 40 should be disposed and oriented such that the post members thereon will tend to hold each track assembly 40 in operating position. Particular positioning pins and post members and their associated apparatus and operations are described in detail in applicant's copending application mentioned before.

The rack 34 is then swung into a position generally perpendicular to the frame 22 of the bale wagon 20, as shown in FIGS. 2 and 3. In this position the tines 38 are disposed such that they may be slid under the stack of bales 100 which are to be retrieved. One end of each track cable 96 is secured to the hook 62 of the respective support member 50, the opposite end of the track cable 96 being secured to the larger diameter portion 86 of the respective cable drum 72. As shown in FIGS. 2 and 3, the bale wagon 20 has been positioned such that the wheels 24 of the bale wagon 20 are in engagement with the wire mesh grid 60 of the respective track assembly 40.

The gears of the bale wagon 20 are placed in a neutral position and the brake is then released. Each hydraulic cylinder 42 is then actuated, thereby retracting the shaft 66 thereof, and also retrieving each respective rod cable 94. As the rod cable 94 is retrieved each respective cable drum 72 will be rotated. The number of revolutions through which each cable drum 72 will turn will depend therefore on the length of the stroke of each hydraulic cylinder 42 and the corresponding diameter of the smaller diameter portion 88 of each cable drum 72.

Since the larger diameter portion 86 and the smaller diameter portion 88 of each cable drum 72. As the larger apparent that the larger diameter portion 86 will be rotated following the rotational movement of the smaller diameter portion 88 of each cable drum 72. As the larger diameter portion 86 is rotated, each track cable 96 will be retrieved about its respective cable drum 72, thereby pulling the bale wagon 20 toward the stock of bales 100.

The larger portion 86 will of course rotate at the same rotational speed with which the smaller diameter portion 88 rotates on each cable drum 72, however since the diameter of the portion 86 is larger than the diameter of the portion 88, a greater length of the track cable 96 will be retrieved by each cable drum 72 than the corresponding length of the rod cable 94 which is released during the rotational movement of each cable drum 72. It is apparent from the foregoing that the different diameter portions 86 and 88 of each cable drum 72, and the particular manner in which the rod cable 94 and the track cable 96 are connected thereto, permit the movement of bale wagon 20 along the track assembly 40 to be controlled independent of the stroke of the particular hydraulic cylinder 42. The cable power transfer 46 therefore proportions the rod cables 94 and the track cables 96 such that the bale wagon 20 will be pulled the required distance toward the stack of bales 100, and yet allow the use of an existing hydraulic cylinder, such as those used in cooperation with the push-off feet, to be used for the power source.

The particular diameter of the portions 86 and 88 will therefore depend on the stroke of the hydraulic cylinders 42 and the length through which the bale wagon 20 is to be moved along each track assembly 40. It is also apparent that in those situations where the length of the stroke of the particular hydraulic cylinders 42 exceeds the length through which the bale wagon is required to be pulled, the larger and smaller diameter portions 86 and 88 of each cable drum 72 could be interchanged to again compensate and correlate the length of stroke of the hydraulic cylinders to the length through which the bale wagon 20 must be pulled.

As mentioned above, the stack retrieving assembly 36 is particularly adapted to be used in cooperation with the existing hydraulic cylinders on a bale wagon which are used as the power source for the push-off feet. However, it should also be noted that a separate pair of hydraulic cylinders could be used in cooperation with the stack retrieving assembly 34, and the present invention would eliminate the necessity of having to size a particular hydraulic cylinder so that the length of the stroke corresponds exactly to the length through which the bale wagon is required to be pulled.

After the bale wagon 20 has been moved along the track assemblies 40 to a position wherein the rack 34 is adjacent the stack of bales, the tines 38 on the rack 34 will be extended lengthwise under the stack of bales 100. The rack 34 is then swung back to a position adjacent the frame 22 of the bale wagon 20, and the tines 38 will lift the stack of bales 100. In this position, the stack of bales may be transported to other areas.

It is apparent that when retrieving a stack of bales using the stack retrieving assembly 36, the wheels 24 of the bale wagon 20 will move along the wire mesh grids 60. The wire mesh grid 60 will therefore provide sufficient traction or footing for the wheels 24, and thereby virtually eliminate slippage, notwithstanding the condition of the terrain in the area in which the bale wagon is being used.

The tines 38 are generally cylindrically shaped and have a conically shaped end 102 thereon. The particular shape of the tines 38 will allow the tines 38 to be slipped under the stack of bales and prevent the tines 38 from digging into the terrain or into the stack of bales. It has also been found that this particular shape of the tines 38 will leave an impression on the stack of bales when the stack of bales is being unloaded from the bale wagon 20, thus facilitating the insertion of the tines 38 under the stack of bales when retrieving same.

Changes may be made in the construction and arrangement of the parts or elements as disclosed herein without departing from the spirit and scope of the invention.

What is claimed is:

1. In a bale wagon for stacking and unstacking bales of hay and the like and which includes a rack onto which layers of the bales are positioned to form a stack of bales, the improvement comprising:
   a plurality of tines secured in spaced relation on one end of the rack and positioned to be moved under a stack of bales being loaded on the bale wagon;
   guide means adapted to be positioned for supporting the bale wagon and guiding the bale wagon toward a stack of bales to be loaded on the bale wagon; and
   a retrieving means supported on the bale wagon comprising:
      a hydraulic cylinder means including a shaft having an end thereon, said shaft adapted to reciprocate as the hydraulic cylinder means is actuated;
      a cable means secured between the guide means and the hydraulic cylinder means for pulling the bale wagon a certain distance toward the stack of bales and forcing the tines under the stack of bales upon actuation of the retrieving means; and
      cable power transfer means connected to the cable means generally between the hydraulic cylinder means and the guide means, said cable power transfer means being adapted to proportion said cable means so that the bale wagon is pulled toward the stack of bales in response to the stroke of the hydraulic cylinder means.

2. The bale wagon of claim 1 wherein the cable power transfer means is defined further to include a cylindrically shaped cable drum means rotatably mounted on the frame of the bale wagon, said cable drum means having a large diameter portion and a small diameter portion, and wherein the cable means is characterized further to include a rod cable having opposite ends, one end of said rod cable being secured to the end of the shaft of the hydraulic cylinder means and the opposite end thereof being secured to the cable drum means, and a track cable having opposite ends, one end of said track cable being secured to the cable drum means and the opposite end thereof being secured to the guide means.

3. The bale wagon of claim 2 wherein the end of the rod cable securet to the cable drum means is secured to the smaller diameter portion thereof; and wherein the end of the track cable secured to the cable drum means is secured to the larger diameter portion thereof.

4. The bale wagon of claim 1 wherein the tines have a generally circular shaped cross section, and wherein the outermost end of each tine with respect to the rack is conically shaped.

5. The bale wagon of claim 1 wherein the guide means is characterized further to include a pair of track assemblies, each track assembly comprising:
   a support member, sized to accommodate the wheels of the bale wagon; and
   a wire mesh grid means secured to the upper side portion of the support member to provide traction tor the wheels of the bale wagon as the bale wagon is pulled toward the stack of bales.

6. In a bale wagon for stacking and unstacking bales of hay and the like and which includes a rack onto which layers of the bales are positioned to form a stack of bales, the improvement comprising:
   a plurality of tines secured in spaced relation on one end of the rack and positioned to be moved under a stack of bales being loaded on the bale wagon;
   a retrieving means supported on the bale wagon comprising:
      a hydraulic cylinder means including a shaft having an end thereon, said shaft adapted to reciprocate as the hydraulic cylinder means is actuated;
      a cable means secured to a fixed point between the stack of bales and the hydraulic cylinder means for pulling the bale wagon a certain distance toward the stack of bales and forcing the tines under the stack of bales upon actuation of the retrieving means; and
      cable power transfer means connected to the cable means, said cable power transfer means being adapted to proportion said cable means so that the bale wagon is pulled toward the stack of bales in response to the stroke of the hydraulic cylinder means.

References Cited

UNITED STATES PATENTS

| | | | |
|---|---|---|---|
| 2,360,341 | 10/1944 | Herrick | 214—354 |
| 3,013,682 | 12/1961 | Unruh | 214—501 |

ALBERT J. MAKAY, Primary Examiner

U.S. Cl. X.R.

214—501

PO-1050
(5/69)

UNITED STATES PATENT OFFICE
CERTIFICATE OF CORRECTION

Patent No. 3,534,878                Dated October 20, 1970

Inventor(s)   Joe B. Monroe

It is certified that error appears in the above-identified patent and that said Letters Patent are hereby corrected as shown below:

Col 4, line 54; delete "the bales into a stack on the bale wagon 20, for transport-" and insert --the bale wagon 20 on the track assemblies 40 generally to- --.

Col 4 line 63 "stock" should be --stack--.

Col. 5 line 53 "East" should be --Each--.

Col. 6 line 9; delete "diameter portion 88 of each cable drum 72. As the larger" and insert --diameter 88 are integral parts of each cable drum 72 it is--.

Col. 6 line 15 "stock" should be --stack--.

SIGNED AND
SEALED
MAR 2 1971

(SEAL)
Attest:

Edward M. Fletcher, Jr.
Attesting Officer

WILLIAM E. SCHUYLER, JR.
Commissioner of Patents